United States Patent
Gonze et al.

(10) Patent No.: US 8,701,388 B2
(45) Date of Patent: Apr. 22, 2014

(54) EXHAUST TREATMENT METHODS AND SYSTEMS

(75) Inventors: Eugene V. Gonze, Pinckney, MI (US); Michael J. Paratore, Jr., Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 307 days.

(21) Appl. No.: 12/776,486

(22) Filed: May 10, 2010

(65) Prior Publication Data
US 2011/0271660 A1    Nov. 10, 2011

(51) Int. Cl.
*F01N 3/035* (2006.01)
*F01N 3/10* (2006.01)
*F01N 9/00* (2006.01)

(52) U.S. Cl.
USPC ............ 60/286; 60/295; 60/297; 60/300; 60/301; 60/303; 60/284

(58) Field of Classification Search
USPC ............ 60/295, 297, 301, 300, 303, 284, 286
See application file for complete search history.

(56) References Cited

U.S. PATENT DOCUMENTS

| | | | |
|---|---|---|---|
| 5,711,149 A * | 1/1998 | Araki | 60/278 |
| 5,746,989 A * | 5/1998 | Murachi et al. | 423/213.7 |
| 2005/0031514 A1 * | 2/2005 | Patchett et al. | 423/239.2 |
| 2005/0069476 A1 * | 3/2005 | Blakeman et al. | 423/239.1 |
| 2008/0307774 A1 * | 12/2008 | Gonze et al. | 60/286 |
| 2009/0074630 A1 * | 3/2009 | Gonze et al. | 422/174 |
| 2009/0266063 A1 * | 10/2009 | Gandhi et al. | 60/301 |
| 2009/0304566 A1 * | 12/2009 | Golden et al. | 423/239.2 |
| 2011/0023463 A1 * | 2/2011 | Dobson et al. | 60/286 |

FOREIGN PATENT DOCUMENTS

DE    102008039585 A1    6/2009

OTHER PUBLICATIONS

German Office Action dated Oct. 25, 2012, 5 pages.

* cited by examiner

*Primary Examiner* — Kenneth Bomberg
*Assistant Examiner* — Brandon Lee
(74) *Attorney, Agent, or Firm* — Cantor Colburn LLP

(57) ABSTRACT

A method of controlling an exhaust treatment system, comprising: selectively determining a first control state from a plurality of control states based on an exhaust temperature and a plurality of activation temperatures; estimating a reductant dose based on the control state; and controlling an injection of a reductant to the exhaust treatment system based on the reductant dose.

18 Claims, 4 Drawing Sheets

EXHAUST TREATMENT METHODS AND SYSTEMS

FIELD OF THE INVENTION

Exemplary embodiments of the present disclosure relate to control methods and systems for exhaust systems, and more particularly to control methods and systems for controlling the reduction of exhaust constituents in exhaust systems.

BACKGROUND OF THE INVENTION

Exhaust gas emitted from an internal combustion engine, for example, a diesel engine, is a heterogeneous mixture that contains gaseous emissions such as carbon monoxide (CO), unburned hydrocarbons (HC) and oxides of nitrogen (NOx) as well as condensed phase materials (liquids and solids) that constitute particulate matter. Catalyst compositions typically disposed on catalyst supports or substrates are provided in an engine exhaust system to convert certain, or all of these exhaust constituents into non-regulated exhaust gas components.

In some cases, one or more selective catalytic reduction (SCR) devices are provided to reduce the amount of NOx in the exhaust. The SCR devices make use of ammonia ($NH_3$) or other reductant to reduce the NOx. For example, when the proper amount of $NH_3$ is available at the SCR device under the proper conditions, the $NH_3$ reacts with the NOx in the presence of an SCR catalyst to reduce the NOx emissions to, for example, nitrogen.

Accordingly, it is desirable to provide systems and methods for controlling the amount of reductant that is available at the SCR device to reduce NOx.

SUMMARY

In one exemplary embodiment, a method of controlling an exhaust treatment system is provided. The method includes selectively determining a first control state from a plurality of control states based on an exhaust temperature and a plurality of activation temperatures; estimating a reductant dose based on the control state; and controlling an injection of a reductant to the exhaust treatment system based on the reductant dose.

The above features and advantages and other features and advantages of the present invention are readily apparent from the following detailed description of carrying out the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

Figure 1:
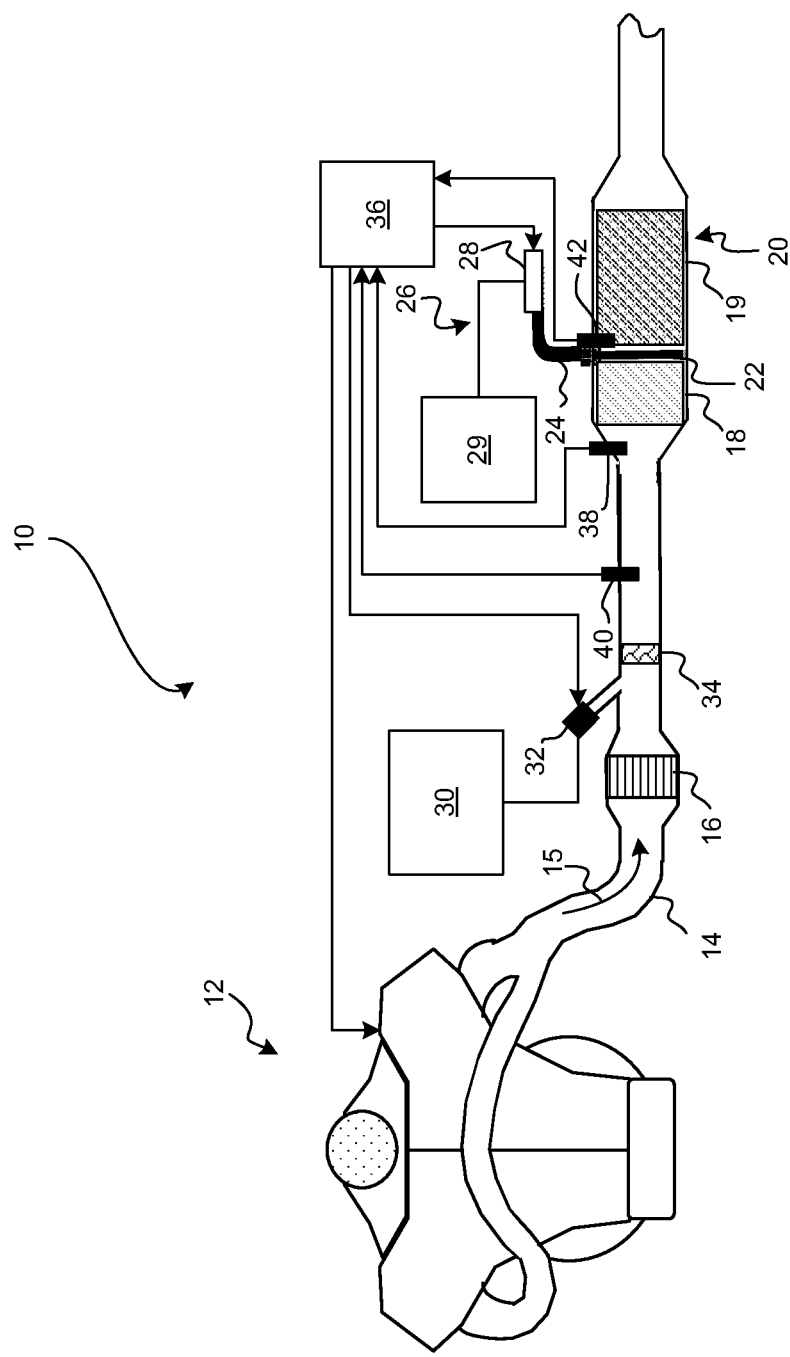
FIG. 1 is a schematic illustration of an exhaust system in accordance with an exemplary embodiment.

The following description is merely exemplary in nature and is not intended to limit the present disclosure, application or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, or a combinational logic circuit.

Referring now to FIG. 1, an exemplary embodiment is directed to an exhaust treatment system 10 for the reduction of regulated exhaust gas constituents of an internal combustion engine (IC) engine 12. As can be appreciated, the exhaust treatment system 10 described herein can be implemented in various engine systems. Such engine systems may include, for example, but are not limited to, diesel engines, gasoline direct injection systems, and homogeneous charge compression ignition engine systems.

As shown in FIG. 1, the exhaust treatment system 10 generally includes one or more exhaust gas conduits 14, and one or more exhaust treatment devices. The exhaust treatment devices include, for example, an oxidation catalyst (OC) 16, a selective catalytic reduction device (SCR) 18, and a particulate filter (PF) 19. In various embodiments, the PF can be implemented as a two-way selective catalytic reduction and particulate filter device (SCR/PF) 20. As can be appreciated, the exhaust treatment system 10 of the present disclosure may include various combinations of one or more of the exhaust treatment devices shown in FIG. 1, and/or other exhaust treatment devices (not shown) and is not limited to the present example.

In FIG. 1, the exhaust gas conduit 14, which may comprise several segments, transports exhaust gas 15 from the engine 12 to the various exhaust treatment devices of the exhaust treatment system 10. As can be appreciated, the OC 16 can be of various flow-through, oxidation catalysts known in the art. In various embodiments the OC 16 may include a flow-through metal or ceramic monolith substrate that is wrapped in an intumescent mat or other support, that expands when heated, securing and insulating the substrate. The substrate may be packaged in a stainless steel shell or canister having an inlet and an outlet in fluid communication with exhaust gas conduit 14. The substrate may include an oxidation catalyst compound disposed thereon. The oxidation catalyst compound may be applied as a wash coat and may contain platinum group metals such as platinum (Pt), palladium (Pd), rhodium (Rh) or other suitable oxidizing catalysts, or combination thereof. The OC 16 is useful in treating unburned gaseous and non-volatile HC and CO, which are oxidized to form carbon dioxide ($CO_2$) and water ($H_2O$).

The SCR 18 may be disposed downstream of the OC 16. The SCR operates to reduce the oxides of nitrogen ($NO_x$) in the exhaust gas 15. The SCR 18 may be constructed with a flow-through ceramic or metal monolith substrate that is wrapped in an intumescent mat or other support that expands when heated to secure and insulate the substrate which is packaged in a rigid shell or canister having an inlet and an outlet in fluid communication with the exhaust gas conduit 14. The substrate may include a $NO_x$ reducing catalyst composition such as an SCR catalyst composition applied thereto. The SCR catalyst composition may include a zeolite and one or more base metal components such as iron (Fe), cobalt (Co), copper (Cu) or vanadium (V) that can operate efficiently to convert $NO_x$ constituents in the exhaust gas 15 in the presence of a reductant such as ammonia ($NH_3$).

The SCR/PF 20 may likewise be disposed downstream of the OC 16. The SCR/PF 20 operates to filter the exhaust gas 15 of carbon and other particulates as well as to further reduce $NO_x$ constituents in the exhaust gas 15. As can be appreciated, the SCR/PF 20 can be of various particulate filters known in the art. In various embodiments, the SCR/PF 20 may be constructed using a wall flow monolith filter or other devices, such as, for example, wound or packed fiber filters, open cell foams, sintered metal fibers, etc. As shown in FIG. 1, the filter of the SCR/PF 20 may be wrapped in an intumescent mat or other support that expands when heated to secure and insulate the substrate, and may be packaged in the rigid shell or canister of the SCR 18. In various other embodiments, the SCR/PF 20 is packaged separately from the SCR 18.

The SCR/PF 20 includes an SCR catalyst composition applied to the filter. The SCR catalyst composition can likewise contain a zeolite and one or more base metal components such as iron (Fe), cobalt (Co), copper (Cu) or vanadium (V) which can operate efficiently to convert NOx constituents in the exhaust gas 15 in the presence of a reductant, such as, $NH_3$. In various embodiments, the SCR/PF 20 includes an iron (Fe) based composition and the SCR 18 includes a copper (Cu) based composition. As can be appreciated, other combinations of catalyst compositions can be applied to the SCR/PF 20 and the SCR 18, as the disclosure is not limited to the present example. Moreover, the disclosure can be applicable to implementations where the SCR/PF 20 includes at least two catalyst compositions applied thereto.

For regeneration purposes, the SCR/PF 20 includes an electrically heated device (EHD) 22 that operates to generate the high temperatures needed for regeneration. In various embodiments, the EHD 22 heats the exhaust gas 15 passing through the filter and/or heats areas of the filter itself. The EHD 22 may be constructed of any suitable material that is electrically conductive such as a wound or stacked metal monolith. In various embodiments, the EHD 22 can include an SCR catalyst composition applied to the heater material. The SCR catalyst composition can likewise contain a zeolite and one or more base metal components such as iron (Fe), cobalt (Co), copper (Cu) or vanadium (V).

The reductant, such as $NH_3$, may be supplied from a reductant supply source 30 and may be injected into the exhaust gas conduit 14 at a location upstream of the SCR 18 and the SCR/PF 20 using an injector 32, or other suitable method of delivery of the reductant to the exhaust gas 15. The reductant may be in the form of a gas, a liquid, or an aqueous urea solution and may be mixed with air in the injector 32 to aid in the dispersion of the injected spray. A mixer or turbulator 34 may also be disposed within the exhaust conduit 14 in close proximity to the injector 32 to further assist in thorough mixing of the reductant with the exhaust gas 15.

A control module 36 controls the engine 12 and one or more components of the exhaust treatment system 10 based on sensed and/or modeled data. In various embodiments, the control module 36 controls the activation of the EHD 22 and/or the injector 32 based on sensed or modeled inputs and further based on the exhaust treatment control methods and systems of the present disclosure. In one example, a first temperature sensor 38 senses a temperature of the exhaust gas 15 at some point in the exhaust stream before the exhaust gas 15 enters the SCR 18. The temperature sensor 38 generates a first temperature signal based thereon. In another example, an exhaust sensor 40 senses the flow of the exhaust gas 15 at some point in the exhaust stream before the exhaust gas 15 enters the SCR 18. The exhaust sensor 40 generates an exhaust flow signal based thereon. In yet another example, a second temperature sensor 42 senses the temperature of the EHD 22. The temperature sensor 42 generates a temperature signal based thereon.

Generally speaking, the control module 36 receives the signals and controls at least one of the injector 32 and the EHD 22 based on one or more of the signals and further based on a composition of the SCR catalysts. The control module 36 controls the injector 32 and the EHD 22 to more efficiently reduce NOx and perform PF regeneration.

Figure 2:
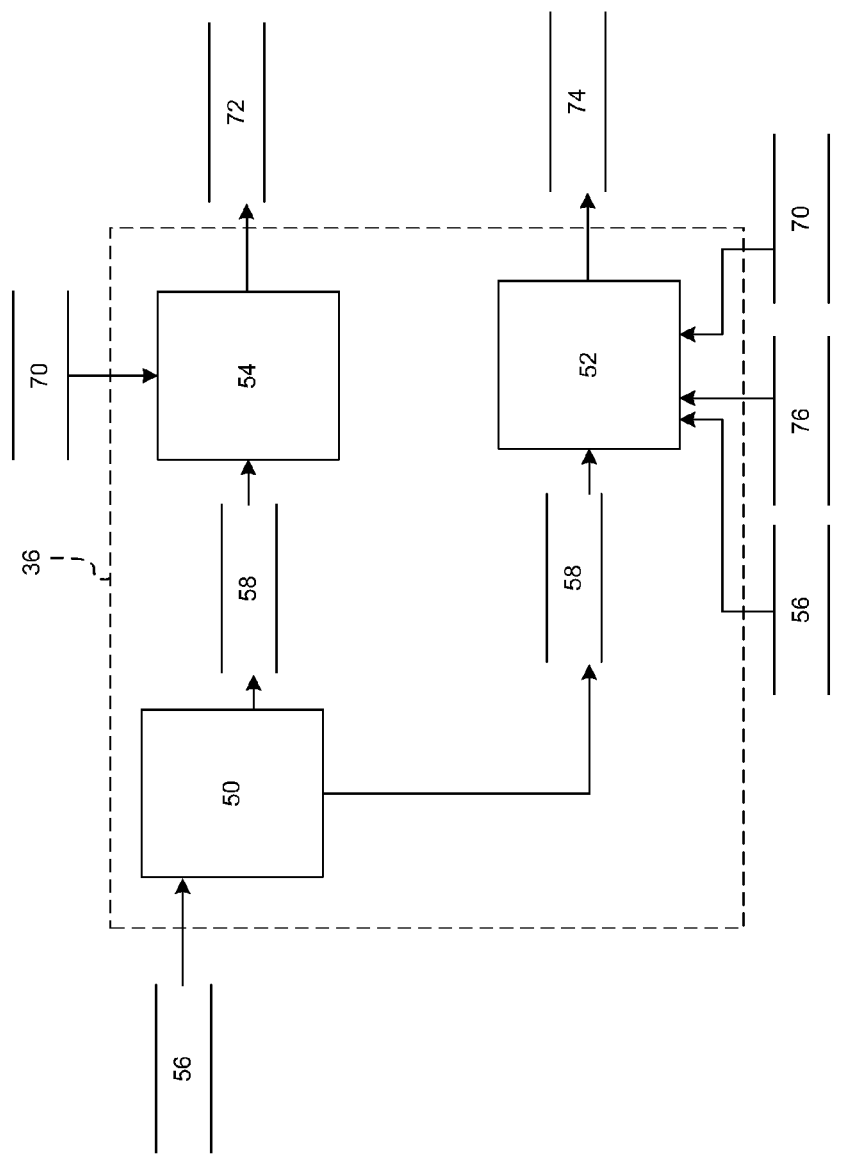
FIG. 2 is a dataflow diagram illustrating an exhaust system control system in accordance with an exemplary embodiment.

Referring now to FIG. 2, a dataflow diagram illustrates various embodiments of an exhaust control system that may be embedded within the control module 36. Various embodiments of exhaust control systems according to the present disclosure may include any number of sub-modules embedded within the control module 36. As can be appreciated, the sub-modules shown in FIG. 2 may be combined and/or further partitioned to similarly control the injector 32 (FIG. 1) and/or the EHD 22 (FIG. 1). Inputs to the control module 36 may be sensed from the engine 12 (FIG. 1), received from other control modules (not shown), and/or determined/modeled by other sub-modules (not shown) within the control module 36. In various embodiments, the control module 36 includes an exhaust temperature evaluation module 50, a reductant control module 52, and a heater control module 54.

Figure 3:
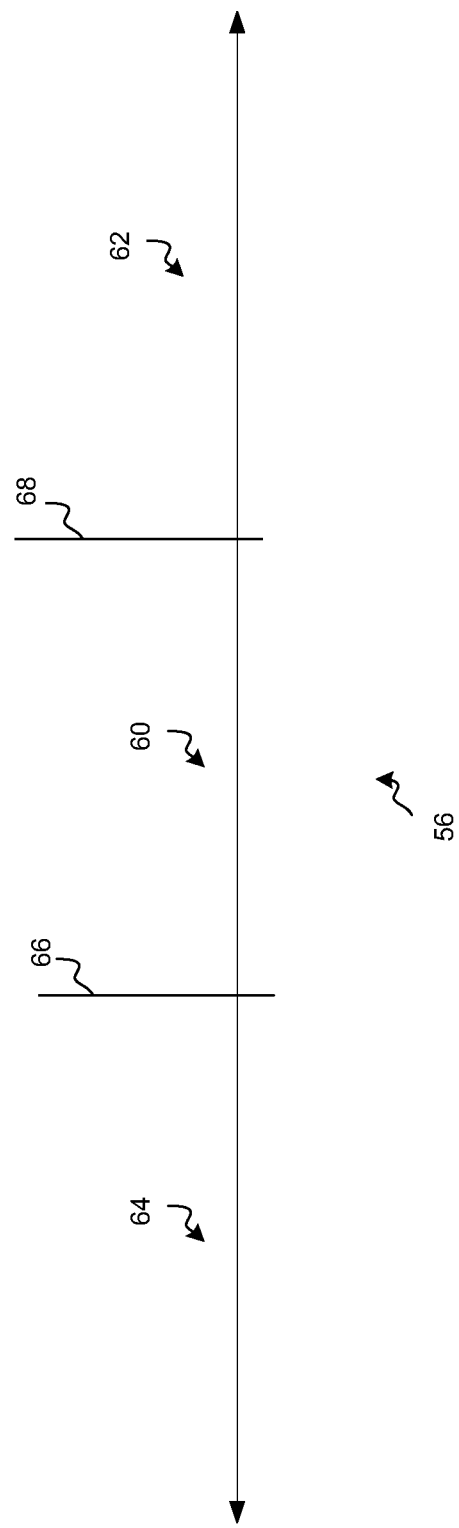
FIG. 3 is a graph illustrating control states of the exhaust system control system in accordance with an exemplary embodiment.

The exhaust temperature evaluation module 50 receives as input exhaust temperature 56. Based on the exhaust temperature 56, the exhaust temperature evaluation module 50 determines a control state 58. In various embodiments, the control state 58 can be at least one of a low temperature state 60, a high temperature state 62, and a cold start state 64. FIG. 3 illustrates the various exemplary states that are based on exhaust temperature 56. For example, when the exhaust temperature 56 is low (e.g., less than a first temperature threshold 66 indicating an activation temperature of the catalyst on the SCR 18 (FIG. 1), or within a first temperature range), the exhaust temperature evaluation module 50 sets the control state 58 to the cold start state 64. In another example, when the exhaust temperature 56 is high (e.g., greater than a second temperature threshold 68 indicating an activation temperature of the catalyst on the SCR/PF 20 (FIG. 1), or within a second temperature range), the exhaust temperature evaluation module 50 sets the control state 58 to the high temperature state 62. In yet another example, when the exhaust temperature 56 is not high and is not low (e.g., within a medium range), the exhaust temperature evaluation module 50 sets the control state 58 to the low temperature state 60.

With reference back to FIG. 2, the heater control module 54 receives as input the control state 58 and heater temperature 70. Based on the control state 58, the heater control module 54 controls the switching device 28 associated with the EHD 22 (FIG. 1). For example, when the control state 58 is the cold start state 64 (FIG. 3), the heater control module 54 generates a heater control signal 72 to activate the EHD 22 (FIG. 1). The activated EHD 22 (FIG. 1) is then used to initiate the reduction of NOx. In another example, when the control state 58 is the low temperature state 60 (FIG. 3) or the high temperature state 62 (FIG. 3), the heater control module 54 deactivates the EHD 22 (FIG. 1) via the switching device 28.

The reductant control module 52 receives as input the control state 58. Based on the control state 58, the reductant control module 52 determines a reductant dose to be supplied to the exhaust gas 15 (FIG. 1). In various embodiments, the reductant dose is determined based on the physical make-up of the exhaust treatment system 10 (FIG. 1) as well as based on the current operating conditions of the exhaust treatment system 10 (FIG. 1), such as exhaust temperature 56 and exhaust flow 76. Based on the reductant dose, the reductant control module 52 generates an injector control signal 74 to the injector 32 (FIG. 1) to control the injection of the reductant into the exhaust gas 15 (FIG. 1).

In various embodiments, the reductant control module 52 determines the reductant dose based on an active volume of the treatment devices. In one example, the reductant control module 52 selectively determines the active volume based on the control state 58. Provided the examples in FIGS. 1 and 3, when the control state 58 is the low temperature state 60, the reductant control module 52 determines the active volume of the SCR 18 including for example, the copper (Cu) based composition. The reductant control module 52 can determine the active volume by, for example, predicting a heat transfer from exhaust flow to the SCR 18. The prediction can be based on, for example, the exhaust temperature 56 and the exhaust flow 76.

When the control state 58 is the high temperature state 62, the reductant control module 52 determines the reductant dose based on the active volume of the SCR/PF 20 (FIG. 1) including for example the iron (Fe) based composition and based on the SCR 18 (FIG. 1) including for example, the copper (Cu) based composition. The reductant control module 52 can determine the active volume by, for example, predicting a heat transfer from the exhaust flow 76 to the SCR 18 (FIG. 1). The prediction can be based on, for example, the exhaust temperature 56 and the exhaust flow 76.

When the control state 58 is the cold start state 64, the reductant control module 52 determines the reductant dose based on an active heater volume. The reductant control module 52 can determine the active heater volume based on, for example, the power entering the EHD 22 (FIG. 1), the exhaust temperature 56, and the exhaust flow 76. In various embodiments, the reductant control module 52 determines the reductant dose for the cold start state 64 when the heater temperature 70 is sufficiently high (e.g., a temperature to initiate NOx light-off).

Figure 4:
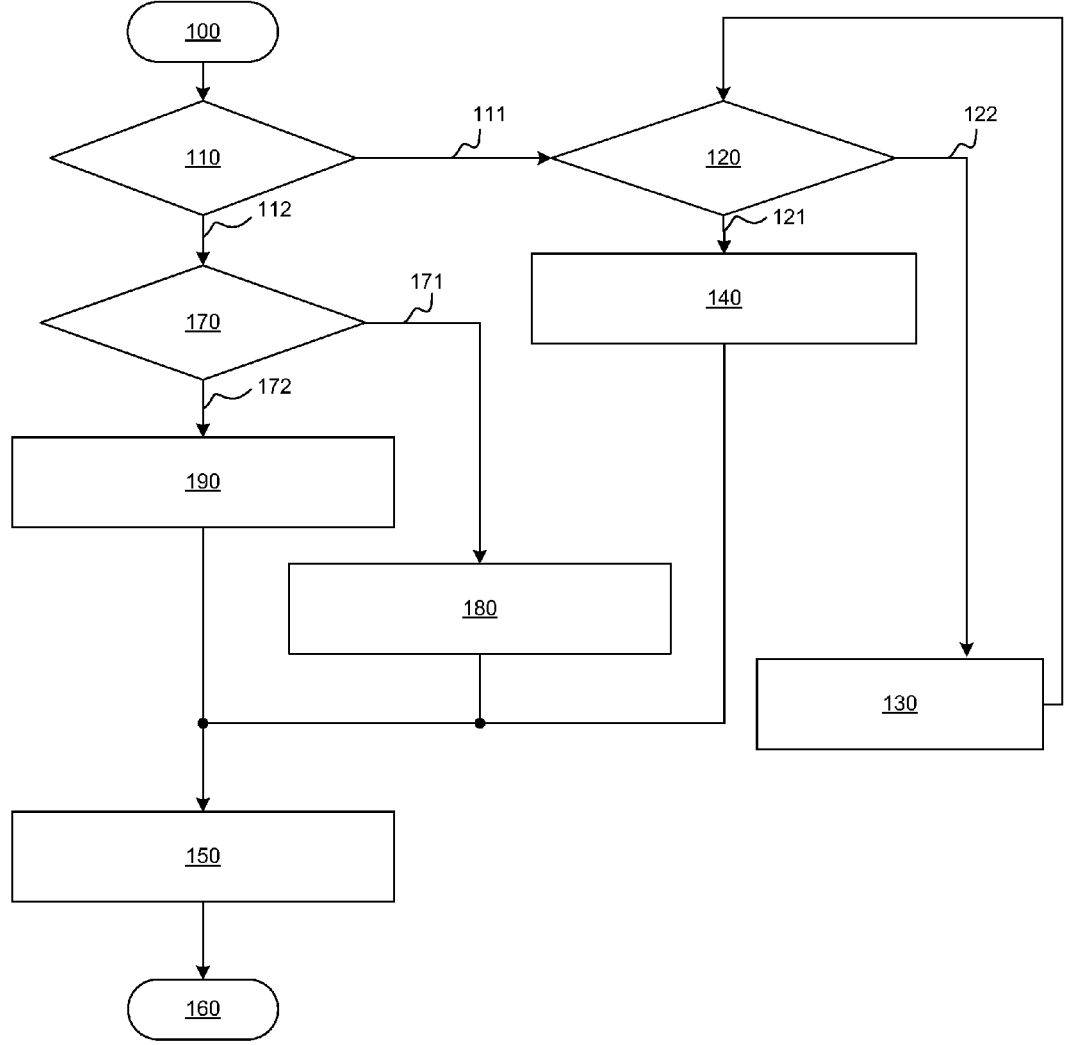
FIG. 4 is a flowchart illustrating an exhaust system control method in accordance with an exemplary embodiment.

Referring now to FIG. 4, and with continued reference to FIGS. 1 and 2, a flowchart illustrates an exhaust treatment control method that can be performed by the control module 36 of FIG. 1 in accordance with the present disclosure. As can be appreciated in light of the disclosure, the order of operation within the method is not limited to the sequential execution as illustrated in FIG. 4, but may be performed in one or more varying orders as applicable and in accordance with the present disclosure.

In various embodiments, the method can be scheduled to run based on predetermined events, and/or run continually during operation of the engine 12.

In one example, the method may begin at 100. The exhaust temperature 56 is evaluated at 110 and 170. If the exhaust temperature 56 is less than a first SCR activation temperature at 111, the heater temperature 70 is evaluated at 120. If the heater temperature 70 is less than a light off temperature threshold at 122, the heater control signal 72 is generated to activate the EHD 22 at 130. Once the heater temperature 70 reaches the temperature threshold at 121, the control state 58 is the cold start state 64 and the reductant dose is determined based on the active volume of the EHD 22 at 140. The injector 32 is controlled based on the reductant dose at 150 and the method may end at 160.

If, however, the exhaust temperature 56 is greater than the first SCR activation temperature 66 at 112, and less than the second SCR activation temperature 68 at 171, the control state 58 is the low temperature state 60 and the reductant dose is determined based on the active volume of the Cu based SCR 18 at 180. The injector 32 is controlled based on the reductant dose at 150 and the method may end at 160.

If, however, the exhaust temperature 56 is greater than the first SCR activation temperature 66 at 112 and greater than the second SCR activation temperature 68 at 172, the control state 58 is the high temperature state 62 and the reductant dose is determined based on the active volume of the Cu based SCR 18 and further based on the active volume of the Fe based SCR/PF 20 at 190. The injector 32 is controlled based on the reductant dose at 150 and the method may end at 160.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. A method of controlling an exhaust treatment system having a particulate filter, a first selective catalytic reduction device and a second selective catalytic reduction device for reducing an amount of NOx in an exhaust gas passing through the exhaust treatment system, the first selective catalytic reduction device having a first activation temperature above which NOx is reduced in association with a first active volume of the first selective catalytic reduction device, the second selective catalytic reduction device having a second activation temperature that is greater than the first activation temperature and above which NOx is reduced in association with a second active volume of the second selective catalytic reduction device, the method comprising:

providing an electronic control module configured to operate the exhaust treatment system in a cold start state, a low temperature state, and a high temperature state, the electronic control module further configured to determine a temperature of the exhaust gas and to control an injection of a reductant to the exhaust treatment system; and in the electronic control module:
selectively determining based on the temperature of the exhaust gas and the first activation temperature and the second activation temperature, whether the exhaust treatment system is operating in the cold start state, the low temperature state, or the high temperature state, wherein the high temperature state is indicated when the temperature of the exhaust gas is greater than the second activation temperature, wherein the second low temperature state is indicated when the temperature of the exhaust gas is greater than the first activation temperature and less than the second activation temperature, and wherein the cold start state is indicated when the temperature of the exhaust gas is less than the first activation temperature;

estimating a reductant dose; and controlling an injection of the reductant dose to the exhaust treatment system;

wherein, if the control state is exhaust treatment system is operating in the cold start state, then said estimating is based on a temperature of a heater associated with the particulate filter;

wherein, if the exhaust treatment system is operating in the low temperature state, then said estimating is based on the first active volume; and wherein, if the exhaust treatment system is operating in the high temperature state, then said estimating is based on the second active volume.

2. The method of claim 1 wherein the first activation temperature is related to a first composition of the first selective catalytic reduction device and the second activation temperature is related to a second composition of the second selective catalytic reduction device.

3. The method of claim 1 wherein the first activation temperature is based on an activation temperature of a copper based selective catalytic reduction device.

4. The method of claim 1 wherein the second activation temperature is based on an activation temperature of an iron based selective catalytic reduction device.

5. The method of claim 1 wherein the estimating the reductant dose is based on an active heater volume determined based on a power entering the heater, the temperature of the exhaust gas, and a flow rate of the exhaust gas.

6. The method of claim 1 further comprising controlling the heater on when the temperature of the heater is below a temperature threshold.

7. The method of claim 1 wherein the estimating the reductant dose is further based on a volume of the first selective catalytic reduction device when the control state is the third state.

8. An exhaust treatment system comprising:
a particulate filter;
a heater associated with the particulate filter;
a first selective catalytic reduction device including a first catalyst composition defining a first activation temperature above which NOx is reduced in association with a first active volume of the first selective catalytic reduction device;
a second selective catalytic reduction device is disposed downstream of the first selective catalytic reduction device, the second selective catalytic reduction device including a second catalyst composition defining a second activation temperature above which NOx is reduced in association with a second active volume of the second selective catalytic reduction device, the second activation temperature being greater that the first activation temperature; and
an electronic control module configured to operate the exhaust treatment system in a cold start state, a low temperature state, and a high temperature state, the control module further configured to determine a temperature of the exhaust gas and to control an injection of a reductant to the exhaust treatment system;
the electronic control module further configured to selectively determine, based on the temperature of the exhaust gas and the first activation temperature and the second activation temperature, whether the exhaust treatment system is operating in the cold start state, the low temperature state, or the high temperature state, wherein the high temperature state is indicated when the temperature of the exhaust gas is greater than the second activation temperature, wherein the low temperature state is indicated when the temperature of the exhaust gas is greater than the first activation temperature and less than the second activation temperature, and wherein the cold start state is indicated when the temperature of the exhaust gas is less than the first activation temperature;
the electronic control module further configured to determine a reductant dose and to control an injection of the reductant dose to the exhaust treatment system such that:
when the control state is the exhaust treatment system is operating in the cold start state, then the reductant dose is determined based on a temperature of the heater associated with a the particulate filter;
when the exhaust treatment system is operating in the low temperature state, then the reductant dose is determined based on the first active volume; and
when the exhaust treatment system is operating in the high temperature state, then the reductant dose is determined based on a the second active volume.

9. The system of claim 8 wherein the first catalyst composition is a copper based composition.

10. The system of claim 8 wherein the second catalyst composition is an iron based composition.

11. The system of claim 8 wherein the control module selectively determines the reductant dose further based on an exhaust temperature.

12. The system of claim 8 wherein the second selective catalytic reduction device includes the particulate filter.

13. The system of claim 12 wherein the particulate filter includes a heater that is electrically heated.

14. The system of claim 13 wherein the control module selectively determines the reductant dose based on an activation temperature of the heater.

15. A method of controlling an exhaust treatment system having a heater associated with a particulate filter, a first selective catalytic reduction device and a second selective catalytic reduction device for reducing an amount of NOx in an exhaust gas passing through the exhaust treatment system, the first selective catalytic reduction device having a first activation temperature above which NOx is reduced in association with a first active volume of the first selective catalytic reduction device, the second selective catalytic reduction device having a second activation temperature that is greater than the first activation temperature and above which NOx is reduced in association with a second active volume of the second selective catalytic reduction device, the method comprising:
providing an electronic control module; and
in the electronic control module:
determining a temperature of the exhaust gas;
determining a reductant dose; and
controlling an injection of the reductant dose to the exhaust treatment system;
wherein, if the exhaust treatment system is operating in the cold start state, then said determining the reductant dose is based on a temperature of the heater associated with the particulate filter;
wherein, if the exhaust temperature is greater than the first activation temperature but less than the second activation temperature, the determining the reductant dose is based on the first active volume, wherein the first selective catalytic reduction device includes a copper based catalyst composition; and
wherein, if the exhaust temperature is greater than the second activation temperature, the determining the reductant dose is based on the first active volume and the second active volume, wherein the second selective catalytic reduction device includes an iron based catalyst composition.

16. The method of claim 15, further comprising evaluating a temperature of the heater if the temperature of the exhaust gas is less than the first activation temperature.

17. The method of claim 16, further comprising activating the heater if the is less than a light-off temperature threshold.

18. The method of claim 17, further comprising determining the reductant dose based on an active volume of the heater if the temperature of the heater exceeds the light-off temperature threshold.

* * * * *